United States Patent Office 3,410,918
Patented Nov. 12, 1968

3,410,918
PREPARATION OF PROPYNYLSODIUM AND PROPYNYLLITHIUM
Oscar F. Beumel, Jr., West Chester, and William Novis Smith, Jr., Exton, Pa., assignors to Foote Mineral Company, Exton, Pa., a corporation of Pennsylvania
No Drawing. Filed July 11, 1966, Ser. No. 563,970
8 Claims. (Cl. 260—665)

The present invention relates to the preparation of propynylsodium and propynyllithium; and more particularly, the present invention relates to a relatively inexpensive method for making propynylsodium and propynyllithium.

Propynylsodium and propynyllithium are useful as intermediates in the synthesis of organo compounds since they react readily with ketones, to add the propynyl group at the keto site, and with labile chlorides, like trimethyl lead chloride, to form trimethyl propynyl lead, a gasoline additive.

Propynyllithium has been prepared from propyne and an organolithium reagent in an ether or hydrocarbon solvent or from propyne and lithium amide in liquid ammonia. Propynyllithium may also be prepared by the method of Patent 3,234,277. Although British Patent 771,708 discloses the preparation of lithium acetylide in tetrahydrofuran from acetylene and lithium metal, this work could not be repeated, and the reaction using propyne, (methyl acetylene) and lithium dispersion in refluxing tetrahydrofuran did not proceed. We have found that sodium metal, on the other hand, reacts with propyne in an ether, such as tetrahydrofuran, or in hydrocarbon solvents, such as toluene at reflux.

Propyne, however, is a very expensive material.

It is the principal object to provide a novel method for preparing propynylsodium and propynyllithium.

It is another object to provide an economical method for preparing propynylsodium and propynyllithium in high yields.

Other objects will become apparent from a consideration of the following specification and claims.

The process of the present invention comprises contacting a slurry of sodium metal or lithium metal containing a small amount of sodium with a gaseous mixture of propyne and allene in which the weight ratio of propyne to allene is from about 1:1 to about 4:1.

The aforesaid gaseous mixture of propyne and allene is an inexpensive by-product from the manufacture of butadiene, and has found use as a welding fuel gas. Surprisingly, the allene remains relatively inert so that the lithium or sodium reacts selectively with the propyne. One commercial welding gas containing this mixture also contains about 30–40% of saturated $C_1$ to $C_4$ hydrocarbons, principally propane and butane, as diluents and to prevent flame back. Such other hydrocarbons are also inert and their presence does not detract from the utility of the gas mixture according to the present process.

The sodium or lithium employed will be finely-divided; that is, in well known dispersion form. These are prepared by stirring the molten metal into an inert liquid, such as mineral oil or toluene, so that the metal solidifies as very tiny droplets, usually no more than about 100 microns in size and preferably from about 25 to about 75 microns. The finely-divided metal may be filtered from the liquid to provide, after washing and drying, what is known as dry dispersion, or after simply removing the bulk of the liquid as by filtering or decanting, the metal may be washed with and reslurried in another liquid. On the other hand, if the liquid in which the metal is dispersed is suitable as a reaction medium for the present method, no removal of the metal from the liquid is required and the liquid dispersion may be used as such.

As stated, pure lithium metal will not react with the propyne, and it has been found necessary to include a small amount of sodium with the lithium as by adding the sodium to molten lithium in preparing the dispersion. The amount of sodium so added will generally range from about 0.3 to about 2%, and preferably from about 0.5 to about 1%, by weight, based on the weight of the lithium (see, for example, Journal of the American Chemical Society, Vol. 81, pp. 1497–1503, Mar. 20, 1959, footnote 38b).

In carrying out the reaction, the finely-divided sodium or sodium-containing lithium will be slurried in a suitable inert organic liquid reaction medium. The liquid will be essentially inert to the alkali metal and to the propyne-containing gas. With lithium, an ether type solvent, such as tetrahydrofuran, ethylene glycol dimethyl ether and ethylene glycol diethyl ether, preferably the former, may be used. With sodium can be used any of the foregoing ether type solvents as well as aromatic hydrocarbons, such as toluene, xylene and ethylbenzene, and aliphatic hydrocarbons, like octane. Toluene is preferred. The amount of liquid is not critical since it merely serves as liquid medium for holding the metal in dispersed condition while passing the propyne-allene gas mixture therethrough. Generally, the metal will be in a molar concentration in the solvent of from about 0.5 to about 4.

The principal reaction which takes place is that between the sodium or lithium and the propyne in a 1:1 mol ratio. However, hydrogen is a by-product and it reacts with some of the propyne to reduce it to propene which is not reactive in the system. In addition, some propyne may be swept through the system by the other gases without reacting. Hence, excess propyne over the theoretical 1:1 molar ratio is normally needed.

The gas mixture is passed into the slurry of sodium or sodium-containing lithium until reaction is essentially complete as can be determined visually by noting the disappearance of the metallic sodium or lithium particles and their replacement by white particles or propynyllithium or off-white to pale tan particles of propynylsodium.

The slurry is advantageously heated during the reaction generally to at least 50° C. and preferably at refluxing to insure maximum rate of reaction. When sodium is reacted using a hydrocarbon solvent like toluene, it may be heated to above its melting point in order for the most efficient reaction to be realized. Propynylsodium as well as propynyllithium has incipient solubility in ether type solvents and this slight solubility affords an efficient reaction without requiring melting the metal.

The reaction mixture is agitated, and while this may be accomplished by bubbling the gas mixture and also by refluxing, it is preferred to provide additional agitation, as by stirring vigorously.

In addition, the reaction is carried out in a substantially oxygen-free atmosphere, as under a blanket of an inert gas such as argon, nitrogen, or the like. Once the reaction has started, the gas mixture itself and the hydrogen produced can provide the oxygen-free atmosphere.

Following the reaction, the product slurry can be utilized as such or the solid product may be recovered as by filtering, and washed as with one of the solvents referred to above or pentane.

In spite of the impurity of the propyne-containing reactant and the side reaction taking place, the propynylsodium and propynyllithium products are extremely pure as will appear from the following examples which are given for the purpose of illustration only.

Example 1

A large, round-bottom reaction flask equipped with a thermometer, gas addition tube, stirrer and condenser is purged with argon and then charged with 161 g. (23 mols) of dry lithium dispersion, containing 0.5% of sodium, and 7.0 liters of tetrahydrofuran. The slurry is heated to reflux with vigorous stirring while there is bubbled therethrough a gas mixture containing about 60–70% of a 2:1 by weight mixture of propyne and allene, the balance being saturated hydrocarbons having 1 to 4 carbon atoms, mainly propane and butane ("Mapp" welding gas of Dow Chemical Company). The gas is passed through the slurry for about 9 hours at a rate of 860 g. per hour after which the rate of gas addition is reduced to a substantial extent and the mixture is refluxed for an additional 3 hours. The mixture is then filtered and the product residue is washed with pentane. The yield of white propynyllithium is essentially quantitative with a purity of 97% by gas evolution.

Example 2

Example 1 is repeated using 4.8 g. (0.69 mol) of 0.5% sodium-lithium dispersion in 250 ml. of ethylene glycol dimethyl ether in a 500 ml. round-bottom reaction flask equipped with a thermometer, stirrer, condenser and gas addition tube. The reaction slurry is heated to reflux with vigorous stirring while the propyne-containing gas mixture described in Example 1 is bubbled therethrough. The gas is passed into the slurry for about 3½ hours at a rate of 60 g. per hour, after which the mixture is cooled and filtered using a pentane wash. The propynyllithium weighs 29.1 g. for a yield of 92%.

Example 3

The procedure of Example 1 is followed using 3.5 g. of dry lithium dispersion, containing 1% of sodium, and 250 ml. of tetrahydrofuran in a 500 ml. round-bottom reaction flask equipped with a thermometer, stirrer, condenser and gas addition tube. The reaction slurry is heated to reflux with vigorous stirring while the propyne gas mixture described in Example 1 is bubbled therethrough. The gas is passed into the slurry for about 2½ hours at a rate of 67 g. per hour, after which the reaction mixture is cooled and filtered using a pentane wash. The yield is essentially quantitative, 23 g.

Example 4

When an attempt is made to follow the procedure of Example 3 using, however, pure lithium, no reaction is observed after two hours.

Example 5

A large, round-bottom reaction flask equipped with a thermometer, gas addition tube, stirrer and condenser is purged with argon and then charged with 411 g. (18 mols) of sodium metal and 8.1 liter of toluene. The reaction mixture is heated to reflux, the sodium melts and is dispersed. The propyne-containing gas described in Example 1 is passed through the slurry for about 9 hours at a rate of 840 g. per hour. Then the rate is reduced substantially and the slurry is refluxed for an additonal 3 hours. The mixture is then cooled and filtered using a pentane wash. The yield of propynyl sodium, as a pale tan powder, is essentially quantitative with a purity of 97% by gas evolution.

Example 6

The procedure of Example 5 is followed using 10 g. (4.35 mol) sodium metal and about 200 ml. of toluene in a 500 ml. round-bottom reaction flask equipped with a thermometer, stirrer, condenser and gas addition tube. After the sodium is permitted to settle, the toluene is decanted off and the sodium is washed with tetrahydrofuran. There is then added 250 ml. of tetrahydrofuran. The slurry is heated to reflux with vigorous stirring while the propyne-containing gas described in Example 1 is bubbled therethrough. The gas is passed into the slurry for about 3 hours at the rate of about 45 g. per hour, following which the reaction mixture is cooled and filtered using a pentane wash. The yield is essentially quantitative, 26.1 g.

Example 7

The procedure of Example 6 is followed except that octane is employed as the reaction medium. This results in off-white propynylsodium in essentially quantitative yield, 27 g.

Modification is possible in the selection of reaction media and reagents and in the particular procedural steps and conditions without departing from the scope of the invention.

What is claimed is:

1. The process of making propynylsodium and propynyllithium which comprises passing a gaseous mixture of propyne and allene in which the weight ratio of propyne to allene is from about 1:1 to about 4:1 into a slurry of dispersed alkali metal selected from the group consisting of sodium and a mixture of lithium and from about 0.3 to about 2%, by weight, of sodium, said slurry being under a substantially oxygen-free atmosphere.

2. The process of claim 1 wherein the alkali metal is said mixture of lithium and sodium and is slurried in an ether solvent selected from the group consisting of tetrahydrofuran and ethylene glycol dimethyl ether.

3. The process of claim 2 wherein said slurry is refluxed while said gaseous mixture is passed thereinto.

4. The process of claim 1 wherein said alkali metal is sodium.

5. The process of claim 4 wherein said sodium is slurried in tetrahydrofuran.

6. The process of claim 4 wherein said sodium is slurried in toluene, and wherein said slurry is at a temperature above the melting point of sodium.

7. The process of claim 5 wherein said slurry is refluxed while said gaseous mixture is passed thereinto.

8. The process of claim 6 wherein said slurry is refluxed while said gaseous mixture is passed thereinto.

References Cited

UNITED STATES PATENTS 2,777,884   1/1957   Rutledge et al. _____ 260—665

OTHER REFERENCES

Kirk-Othmer, Encyclopedia of Chemical Technology, vol. 7 (1951 edition), Interscience Encyclopedia, Inc., New York, N.Y.

TOBIAS E. LEVOW, *Primary Examiner.*

A. P. DEMERS, *Assistant Examiner.*

UNITED STATES PATENT OFFICE
CERTIFICATE OF CORRECTION

Patent No. 3,410,918                November 12, 1968

Oscar F. Beumel, Jr., et al.

It is certified that error appears in the above identified patent and that said Letters Patent are hereby corrected as shown below:

Column 3, line 7, "Mapp" should read -- MAPP --. Column 4, line 2, "(4.35 mol) should read -- (.435 mol) --.

Signed and sealed this 10th day of March 1970.

(SEAL)
Attest:

Edward M. Fletcher, Jr.

Attesting Officer

WILLIAM E. SCHUYLER, JR.

Commissioner of Patents